United States Patent [19]
Stehning et al.
[11] Patent Number: 4,670,224
[45] Date of Patent: Jun. 2, 1987

[54] SCRUBBER FOR THE DESULFURIZATION OF FLUE GASES

[75] Inventors: Werner Stehning, Dorsten; Werner Reichwald, Bochum, both of Fed. Rep. of Germany

[73] Assignee: Gottfried Bischoff Bau Kompl. Gasreinigungsund Wasserruckkuhlanlagen GmbH & Co. Kommanditgesellschaft, Essen, Fed. Rep. of Germany

[21] Appl. No.: 713,423

[22] Filed: Mar. 19, 1985

[30] Foreign Application Priority Data

Mar. 20, 1984 [DE] Fed. Rep. of Germany ....... 3410109

[51] Int. Cl.[4] ...................... B01D 50/00; B01D 47/12; B01J 12/00

[52] U.S. Cl. .................................... 422/170; 422/193; 422/234; 423/242; 261/22

[58] Field of Search ............... 422/169, 170, 172, 189, 422/193, 234; 55/73, 223, 229; 423/242 R, 242 A; 261/22

[56] References Cited

U.S. PATENT DOCUMENTS

| | | | |
|---|---|---|---|
| 4,503,020 | 3/1985 | Weissert et al. | 423/242 |
| 4,515,754 | 5/1985 | Stehning | 422/168 |
| 4,533,522 | 8/1985 | Leimkuhler | 422/170 |
| 4,539,024 | 9/1985 | Stehning et al. | 55/223 |
| 4,539,184 | 9/1985 | Stehning | 422/170 |

*Primary Examiner*—David L. Lacey
*Attorney, Agent, or Firm*—Karl F. Ross; Herbert Dubno

[57] ABSTRACT

A scrubber for desulfurization of gases, in particular flue gases of a boiler furnace includes two scrubbing zones each having a plurality of spaced arrays of nozzles for washing the gas with a respective washing liquid containing sulfur compound binding additives. At the bottom portion of the scrubber, the liquid discharged from the nozzles and containing sulfur compounds forms a sump to which limestone is added. From the sump two circulation systems extend. Each circulation system includes a pump which draws off a respective washing liquid from the sump and conveys the latter to the associated one of the scrubbing zones whereby whitewash or lime milk is introduced into one of the circulation systems.

5 Claims, 3 Drawing Figures

1a
3
16a
5
OW
12a
UW
1
16
4
12
A
B 19
9
2
17a
0
II
R
SOURCE OF Ag. Ca(OH)2
17
21
10
19a
7
8
13
18
6
1b
15
14
15

19
20
1

7
22
23

SCRUBBER FOR THE DESULFURIZATION OF FLUE GASES

CROSS REFERENCE TO RELATED APPLICATIONS

This invention concerns the general art found in commonly assigned U.S. Pat. No. 4,539,184 and U.S. Pat. No. 4,515,754.

FIELD OF THE INVENTION

Our present invention relates to a scrubber for the desulfurization of flue gases and, more particularly, to a washing or scrubbing tower connected to a boiler furnace, especially of an electric power plant boiler, for the removal of sulfur, generally in the form of sulfur compounds, from waste gases before these gases are discharged into the atmosphere.

BACKGROUND OF THE INVENTION

From U.S. Pat. No. 4,539,184, a scrubber is known for removing sulfur compounds from a flue gas generated in a boiler combustion chamber. The scrubber is provided with a plurality of nozzles which spray a washing liquid containing fine-grained limestone ($CaCO_3$) onto the flue gas so as to bind sulfur compounds from the flue gas which ascends from an inlet arranged below the nozzles to an outlet above the latter. At the bottom of the scrubber, a sump is formed by the descending liquid flow from which solids are discharged.

The sump is divided into two zones by a grate constituted by an array of oxygen ducts so as to define an upper oxidation zone and a lower reaction zone. The supply of limestone to the sump and thus to the washing liquid which is drawn off from the sump and conveyed to the nozzles is provided by a plurality of ducts located below the grate.

When the flue gas is introduced through the inlet and ascends towards the outlet, it is scrubbed in counterflow by the washing liquid which thus binds the sulfur compounds. Upon passing the oxidation zone, soluble sulfite is oxidized to sulfate which upon further supply of limestone to the reaction zone is converted to gypsum. The gypsum precipitates and can be discharged while the liquid forming the sump and containing limestone is returned to the nozzles.

OBJECTS OF THE INVENTION

It is the principal object of our present invention to provide an improved scrubber for the desulfurization of flue gases, especially of flue gases generated by power plant boiler combustion chambers, in which the energy cost for the scrubbing liquid is reduced without reduction of the degree of desulfurization.

Another object of this invention is to improve upon the teachings of the above-identified applications.

Yet another object is to provide a scrubber with improved scrubbing efficiency and reduced pressure loss in the treated gas.

It is also an object to provide an improved method of operating a scrubber.

SUMMARY OF THE INVENTION

We realize these objects according to the present invention by providing a scrubber of the type and operating under the principles of the above-identified patents, having a column within which two distinct scrubbing zones are defined wherein each of the scrubbing zones is provided with an individual circulation system to allow scrubbing liquid to be recycled from a sump formed at the bottom portion of the column to scrubbing means for each zone to treat the gas with scrubbing liquid. For binding the sulfur compounds of the gas, fine-grained limestone ($CaCO_3$) is added to the sump. Preferably, the scrubbing zones are arranged one above another whereby to scrubbing liquid recycled from the sump to the upper scrubbing zone lime milk (milk of lime) (aqueous $Ca(OH)_2$) is added while the recirculated scrubbing liquid fed to the lower scrubbing zone contains fine grained limestone.

Each of the scrubbing means or zones advantageously includes a plurality of vertically spaced arrays of nozzles (defining respective nozzle zones) and is connected via the respective one of the circulation systems to the sump.

It goes without saying that the number of nozzles or nozzle zones for the lower and upper scrubbing means may vary depending on the requirement of the scrubber.

Each circulation system includes a pump which is connected to the sump via a discharge pipe to draw off scrubbing liquid and communicates with the associated arrays of nozzles.

The supply of lime milk to the circulation system for the upper scrubbing zone can be provided in various manners. In a first embodiment, the introduction of lime milk is provided via supply means which directly communicates with the discharge pipe at a location before the pump. Preferred, however, is an embodiment in which the sump contains an upright bulkhead partition so that the respective area of the sump is divided into two compartments. The intake pipe of the circulation system for the upper set of nozzles as well as the lime-milk supply means communicate with one of the compartments so that lime milk can be fed to the upper scrubbing zone. The other recirculating pump can have an intake side communicating with the other compartment.

According to the teachings of our invention, the bulkhead partition can be provided in the sump containing scrubbing liquid to which limestone has already been added, i.e. can be located fully below the point at which limestone is added to the sump liquid.

Preferably, further supply means are provided at an upper looation within the sump to introduce oxygen so that in a thus defined oxidation zone, calcium sulfite or calcium bisulfite precipitated in this area can be oxidized to calcium sulfate. Via an outlet duct projecting into this area, precipitated solids or desulfurization sludge can be withdrawn. Means for the addition of limestone to the sump is provided below the supply means for introducing oxygen.

Through the provision of a scrubber according to our invention the energy consumption can be considerably reduced since pump energy can be saved. Moreover, the pressure drop within the scrubbing tower is reduced. Nevertheless, the degree of desulfurization is very high when comparing to known prior art devices. In comparison to the prior art, the energy consumption of the pumps can be reduced by approximately 30% while the pressure drop is decreased by approximately 15 to 20 mm water column. A further advantage resides in the fact that the scrubber according to our invention can be of smaller height.

BRIEF DESCRIPTION OF THE DRAWING

The above and other objects, features and advantages of the present invention will become more readily apparent from the following description, reference being made to the accompanying drawing in which.

SPECIFIC DESCRIPTION

The present invention is an improvement and advance over the system described in the German specification DE-OS 32 18 470 (corresponding to U.S. Pat. No. 4,539,184 whose description is incorporated herewith as far as same structural parts are concerned.

Figure 1:
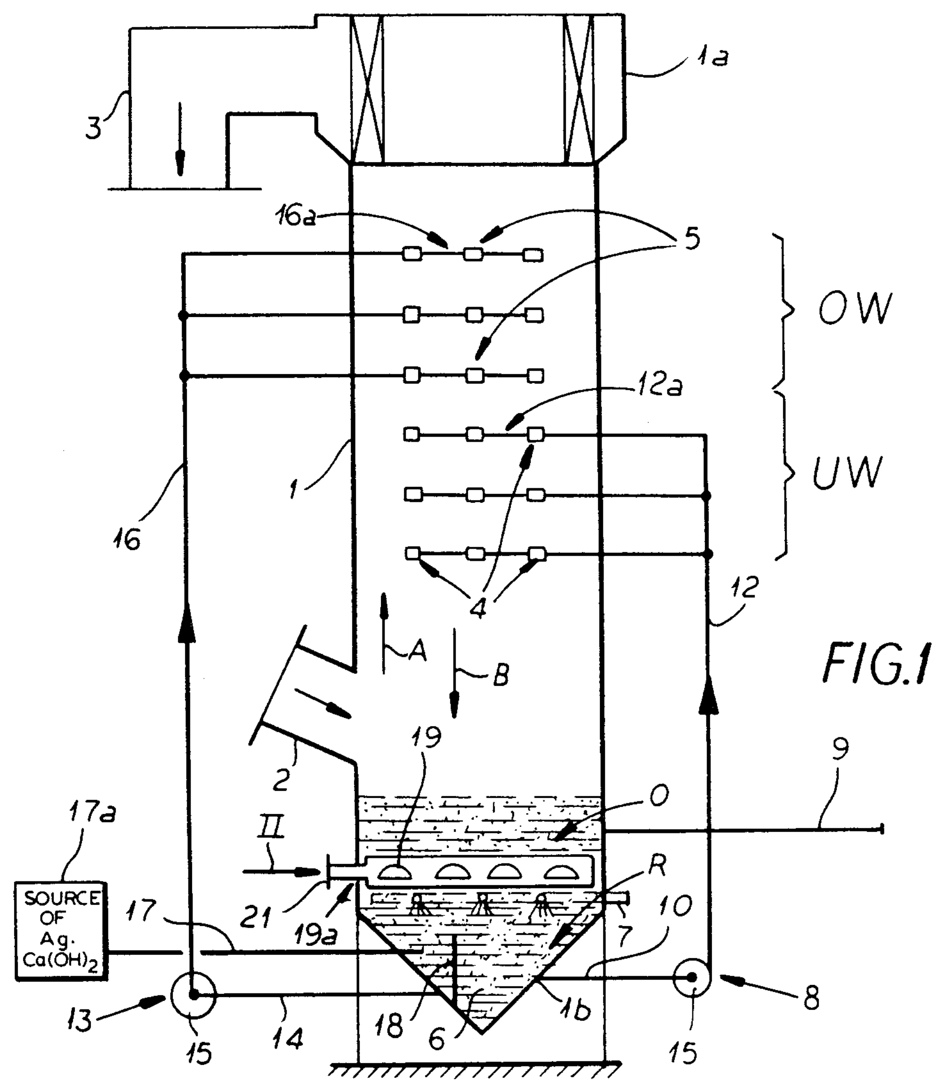
FIG. 1 is a vertical section through a scrubber according to the invention.

Referring firstly to FIG. 1, there is shown a scrubber or scrubbing tower having a scrubbing column 1 which is connected to a boiler furnace (not shown), especially for an electricity power generating plant. The column 1 has an inlet 2 at a lower section thereof through which a flue gas carried off from a combustion chamber of the boiler furnace is introduced into the interior of the column 1 and rises in direction of arrow A in succession through two scrubbing zones OW, UW to a gas outlet 3 arranged following a droplet separator 1*a* at the head of the column 1.

Figure 2:
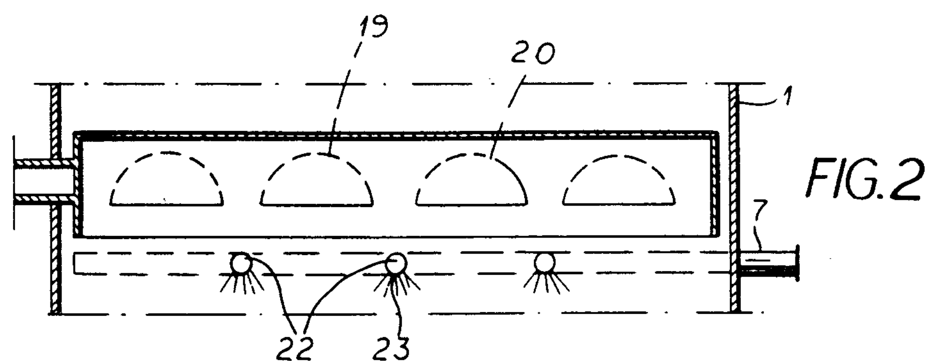
FIG. 2 is an enlarged detail view also in section at the region represented at II in FIG. 1.

The column 1 has a truncated cone-shaped bottom area 1*b* in which a sump 6 of washing or scrubbing liquid is formed. The sump is subdivided into an upper zone O and a lower zone R by a horizontal grate 19*a* which is constituted by a plurality of downwardly open, upwardly convex hoods 19 arranged parallel to each other. At its convex surface which faces the upper zone O, the hoods are provided with orifices 20 (see FIG. 2) so as to allow oxygen supplies via line 21 to be discharged into the upper zone O which thus constitutes the oxidation zone. Connected to the oxidation zone O is an outlet duct 9 through which desulfurization sludge is dischargeable. The spacing between the hoods 19*a* is selected in such a manner that a distinct partition of the upper and lower zones O, R is obtained and no backflow can occur from the lower zone R to the upper zone O.

We may also note that the oxygen is discharged with sufficient pressure through the orifices 20 so as to prevent the washing liquid from penetrating through the orifices into the lower zone R. Arranged below the grate 19*a* are a plurality of elongated pipes 22 connected to line 7 and having downwardly directed discharge nozzles 23 for introducing fine-grained limestone into the lower zone R which constitutes the reaction zone.

As already mentioned, the scrubbing zone is divided into two areas, that is an upper scrubbing zone OW and the lower scrubbing zone UW. Each of the scrubbing zones is provided with a separate circulation system 8, 13 for the washing liquid. The circulation system 8 of the lower zone UW includes arrays of spray nozzles 4 in a vertically spaced relationship. Each such array of nozzles 4 is supplied via a pipe 12 and manifold 12*a* with scrubbing liquid drawn off from the sump 6 by means of a pressure pump 15 which communicates with the sump via a pipe 10.

Likewise, the circulation system 13 of the upper scrubbing zone OW includes arrays of vertically spaced spray nozzles 5 which are fed via pipe 16 and manifold 16*a* with scrubbing liquid from the sump 6 by means of the pressure pump 15 and pipe 14 which connects the pump 15 with the sump 6.

Figure 3:
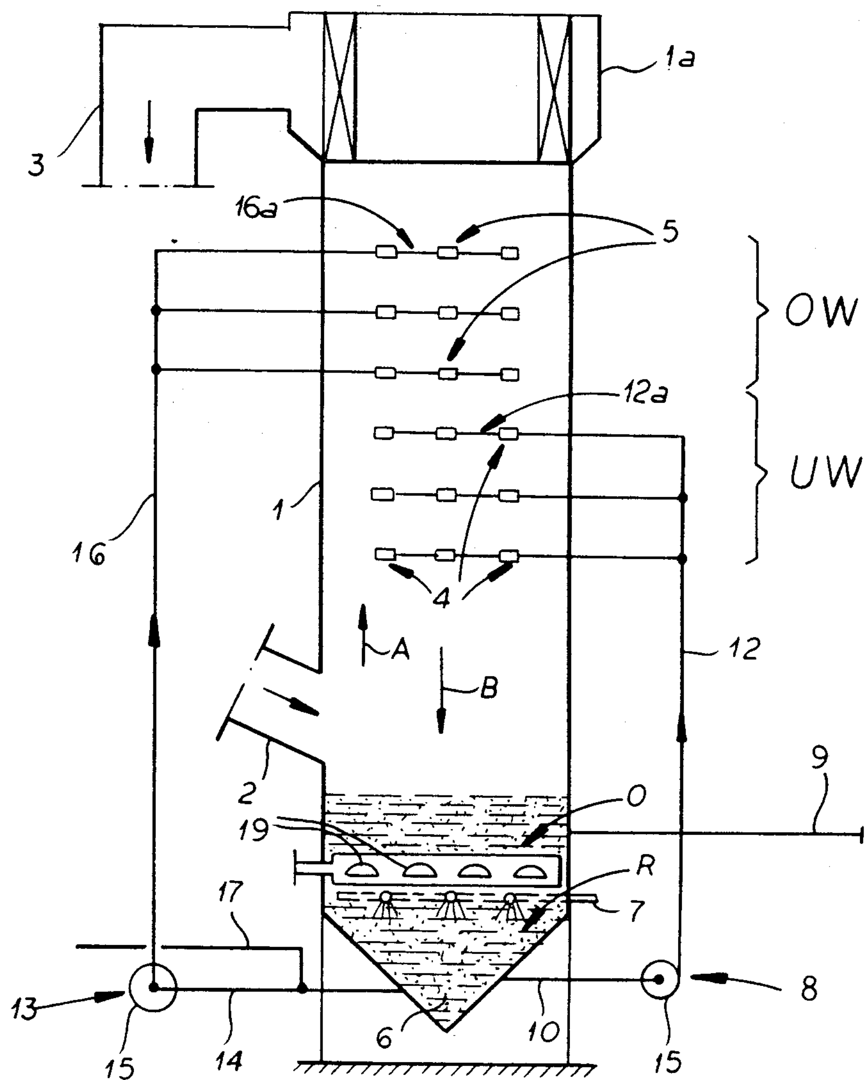
FIG. 3 is a vertical cross section similar to FIG. 1 through another embodiment of the scrubber according to the invention.

Projecting into the sump above pipe 14 is a supply line 17 for introducing lime milk or aqueous calcium hydroxide into the sump 6. The source of the lime milk or aqueous $Ca(OH)_2$ is shown at 17*a*. As can be seen from FIG. 1, the sump 6 is divided at its lower region into two compartments by an upright bulkhead partition 18 which is arranged in the scrubbing liquid already containing limestone and extends beyond the supply line 17 at a distance to the pipes 22. Consequently, pump 15 will draw off via pipe 14 scrubbing liquid containing also lime milk and convey it to the arrays of nozzles 5. We may note that the supply of lime milk to the nozzles 5 can also be provided in any other suitable manner. For example, as shown in FIG. 3, the supply line 17 can be directly connected at any location before the pump 15 to the pipe 14.

During operation, flue gases are introduced through inlet 2 and flow in direction of arrow A in counterflow past the scrubbing liquid discharged by the nozzles 4, 5 of the zones OW, UW and desulfurized gas is discharged through outlet 3. Consequently, the sulfur compounds (sulfur dioxide or sulfur trioxide) are bound in the scrubbing liquid which descends in direction of arrow B and calcium sulfite and calcium bilsulfite are precipitated. In the upper zone 0 of the sump 6, the precipitated calcium sulfite and calcium bisulfite can be oxidized to calcium sulfate which can be withdrawn via outlet duct 9 as desulfurization sludge containing gypsum.

I claim:

1. A scrubber for desulfurizing a flue gas, comprising:

a column having an inlet at a lower portion and an outlet at an upper portion for passing the flue gas through said column from said lower portion to said upper portion, said column including a sump below said lower portion;

first scrubbing means defining an upper scrubbing zone and second scrubbing means defining a lower scrubbing zone located between said inlet and said outlet, each of said scrubbing means discharging a scrubbing liquid into rising flue gas for binding sulfur compounds from the flue gas whereby a scrubbing liquid containing sulfur compounds descends to said sump from which a sludge is withdrawable;

first circulating means for recycling scrubbing liquid from said sump to said first scrubbing means;

a source of lime milk in the form of aqueous calcium hydroxide;

first supply means connected to said source for introducing said lime milk into the scrubbing liquid recycled from said sump through said first circulating means;

second circulating means for recycling scrubbing liquid from said sump to said second scrubbing means;

second supply means for introducing finely divided limestone to the scrubbing liquid whereby scrubbing liquid containing finely divided limestone is fed to said second circulating means so that scrubbing liquid recycled from said sump contains said finely divided limestone before being discharged through said second scrubbing means, each of said first and second circulating means including a pressure pump and an intake pipe connecting said sump with said pump which draws off scrubbing liquid from said sump and conveys it to the respective one of said first and second scrubbing means; and an upright bulkhead partition provided within said sump to divide the latter along a predetermined area into two compartments, said intake pipes of said first and second circulating means opening into respective one of said compartments formed within said sump, said second supply means being positioned so as to discharge the finely divided limestone into said sump above said partition, said first supply means opening into the compartment that said intake pipe of said first circulating means is connected to and being below the level of the top of said partition.

2. A scrubber as defined in claim 1 wherein each of said first and second scrubbing means includes a plurality of vertically spaced arrays of nozzles.

3. A scrubber as defined in claim 1, further comprising third supply means provided at an upper area within said sump for introducing oxygen into said upper area to define an oxidation zone in which calcium sulfite and/or calcium bisulfite precipitated from the descending scrubbing liquid is oxidized into calcium sulfate.

4. A scrubber as defined in claim 3, further comprising an outlet duct communicating with said upper area for withdrawal of desulfurization sludge from said sump.

5. A scrubber for desulfurizing a flue gas, comprising:

a column having an inlet at a lower portion and an outlet at an upper portion for passing the flue gas through said column from said lower portion to said upper portion, said column including a sump below said lower portion;

first scrubbing means defining an upper scrubbing zone and second scrubbing means defining a lower scrubbing zone located between said inlet and said outlet, each of said scrubbing means discharging a scrubbing liquid into rising flue gas for binding sulfur compounds from the flue gas whereby a scrubbing liquid containing sulfur compounds descends to said sump from which a sludge is withdrawable;

first circulating means for recycling scrubbing liquid from said sump to said first scrubbing means;

a source of lime milk in the form of aqueous calcium hydroxide;

first supply means connected to said source and said first circulating means for introducing lime milk in the form of aqueous calcium hydroxide into the scrubbing liquid recycled from said sump through said first circulating means;

second circulating means for recycling scrubbing liquid from said pump to said second scrubbing means;

second supply means for introducing finely divided limestone to the scrubbing liquid whereby scrubbing liquid containing finely divided limestone is fed to said second circulating means so that scrubbing liquid recycled from said sump contains said finely divided limestone before being discharged through said second scrubbing means;

each of said first and second circulating means including a pressure pump and an intake pipe connecting said sump with said pump which draws off scrubbing liquid from said sump and conveys it to the respective one of said first and second scrubbing means;

an upright bulkhead partition provided within said sump to divide the latter along a predetermined area into two compartments, said intake pipes of said circulating means opening into respective zones of said compartments formed within said sump, said second supply means positioned so as to discharge the finely divided limestone into said sump above said partition, said first supply means opening into the compartment that said intake pipe of said first circulating means is connected to and being below the level of the top of said partition; and a third supply means provided at an upper area within said sump for introducing oxygen into said upper area to define an oxidation zone in which calcium sulfite and/or calcium bisulfite precipitated from the descending scrubbing liquid is oxidized into calcium sulfate.

* * * * *